United States Patent [19]

Thorud et al.

[11] Patent Number: 5,090,183
[45] Date of Patent: * Feb. 25, 1992

[54] DISCHARGE CHUTE BLOCKING DEVICE FOR A ROTARY LAWN MOWER

[75] Inventors: Richard A. Thorud, Bloomington; Henry B. Tillotson, Minneapolis, both of Minn.

[73] Assignee: The Toro Company, Minneapolis, Minn.

[*] Notice: The portion of the term of this patent subsequent to Aug. 28, 2008 has been disclaimed.

[21] Appl. No.: 573,939

[22] Filed: Aug. 27, 1990

Related U.S. Application Data

[63] Continuation-in-part of Ser. No. 386,054, Jul. 28, 1989, Pat. No. 4,951,449.

[51] Int. Cl.⁵ .............. A01D 34/70; A01D 34/72; A01D 34/73
[52] U.S. Cl. .......................... 56/2; 56/12.1; 56/17.3; 56/17.5; 56/202; 56/295; 56/320.1; 56/320.2; 56/DIG. 17
[58] Field of Search .......... 56/2, 5, 12.1, 16.7, 56/17.3, 17.5, 157, 202, 255, 295, 320.1, 320.2, DIG. 9, DIG. 17

[56] References Cited

U.S. PATENT DOCUMENTS

| | | | |
|---|---|---|---|
| 2,687,607 | 8/1954 | Sewell | 56/17.4 |
| 2,936,563 | 5/1960 | Blume | 56/320.2 X |
| 2,984,061 | 5/1961 | Stabnau | 56/320.1 |
| 2,992,524 | 7/1961 | Stabnau | 56/320.1 |
| 3,040,990 | 6/1962 | Gotti | 56/12.1 X |
| 3,214,893 | 11/1965 | Griffin | 56/320.2 |
| 3,535,862 | 10/1970 | Wittwer | |
| 3,568,421 | 3/1971 | Smith et al. | 56/202 X |
| 3,648,446 | 3/1972 | Haapoja et al. | 56/320.2 |
| 4,189,903 | 2/1980 | Jackson et al. | 56/255 |
| 4,205,512 | 6/1980 | Thorud | 56/13.4 |
| 4,426,831 | 1/1984 | Klas et al. | 56/295 |
| 4,435,949 | 3/1984 | Heismann | 56/320.2 |
| 4,712,364 | 12/1987 | Oxley | 56/295 |
| 4,951,449 | 8/1990 | Thorud | 56/DIG. 17 X |

FOREIGN PATENT DOCUMENTS

1584495 2/1981 United Kingdom ............ 166/320.1

OTHER PUBLICATIONS

Leaflet entitled "#6-0457 Mulcherizer Kit . . . Mowers," Instruction 1-4445, Snapper Power Equipment, 8/82.
Design News article entitled "Airflow in Mulching Mower Controlled by Baffles," May 8, 1978, pp. 90-91.
Toro Form No. 3311-634, dated 1980.
Toro Form No. 3311-850, dated 1982, pp. 1, 2, 10, 11 and 16.
Toro Form No. 3311-908, dated 1982, pp. 1, 6 and 10.
Document entitled "3-in-1 Housing" which is a Photocopy of a Toro Blueprint, drawing No. 43-7930, dated 1980-1981.
Leaflet entitled "21" Rear Baggers Models 20531 and 20631, Toro Form No. 490-5095C, copyright 1988.
Toro Parts Catalog entitled "8 H.P. & 12 H.P. Professional Rear Engine Riders-Electric," Form No. 3313-910, copyright 1989, pp. 1 and 14.

Primary Examiner—George A. Suchfield
Attorney, Agent, or Firm—R. Lawrence Buckley; James W. Miller

[57] ABSTRACT

A convertible mulching mower (10) including a housing (12) and chute (30). Chute (30) can be selectively blocked with a chute plug (32) to selectively put mower (10) in a mulching mode. Mounted beneath housing (12) is a plurality of kickers (72) which serve to deflect the grass clippings generally downwardly and inwardly to cause them to penetrate the standing grass blades in the cutting path, when the mower (10) is in its mulching mode (when chute plug (32) is blocking discharge chute (30)). When chute plug (32) is removed, it can be replaced by various grass handling means, including a grass bag (36) or a side discharge chute extension (140). A wash-out system (129) can be included in plug (32) to allow the underside of housing (12) to be sprayed with water to remove accumulated grass clippings. Wash-out system (129) can be used for mulching or non-mulching mowers.

29 Claims, 8 Drawing Sheets

DISCHARGE CHUTE BLOCKING DEVICE FOR A ROTARY LAWN MOWER

This is a continuation-in-part of application Ser. No. 07/386,054, filed on July 28, 1989, now U.S. Pat. No. 4,951,449.

FIELD OF INVENTION

The present invention relates broadly to lawn mowers and in particular to discharge chute blocking devices for rotary mowers.

BACKGROUND OF THE INVENTION

The present invention generally pertains to rotary lawn mowers. A rotary mower may be generally defined as a mowing implement with a cutting blade mounted for rotation about a substantially vertical axis to define a generally horizontal rotary cutting path.

There are at least three different ways to handle the grass clippings created by a rotary lawn mower. The clippings can be bagged; simply thrown on top of the lawn using a side discharge chute or chute extension; or "mulched." As one aspect of the present invention pertains particularly to a convertible rotary lawn mower which can selectively bag, throw or mulch grass clippings, all three approaches will be described briefly below.

As noted above, one way to deal with grass clippings produced by a rotary lawn mower is simply to scatter the grass clippings over the top surface of the cut lawn. This is normally accomplished by using a side discharge mower or rear bagger with a side discharge chute extension. Although this approach is quick and easy, if a highly groomed lawn is desired it is generally thought that this particular approach is not optimum. The layer of grass clippings lying atop the lawn tends to yellow and detract from the lush, green appearance normally associated with a healthy lawn. What's more, the layer of grass clippings can prevent the free transport of water and sunlight to the growing grass blades and the decomposing grass clippings cannot efficiently return nutrients to the soil. However, there are indeed situations when a side discharge approach is highly desirable. For example, if the grass is extremely long and the appearance of the lawn is not of paramount importance, side discharging might be the best approach.

Given the fact that simply scattering the grass clippings in a layer atop the lawn is sometimes undesirable, bagging and mulching are often considered advantageous. Collecting the grass clippings in a grass bag is important if one wants to achieve a formal, "groomed" appearance and if one wishes to prevent grass clippings from being tracked into the house. Using a grass bag is sometimes desirable from a safety standpoint, as well, as it can reduce the risk of thrown objects.

Although bagging grass clippings has the advantages described briefly above, it also has some disadvantages which make it less than desirable in certain circumstances. For example, it can be very time consuming to empty a grass bag every time it fills. If long, lush grass is being mowed, it may be required to empty the grass bag every five or ten minutes or so, thus possibly doubling the time it takes to mow the lawn. Also, there is the issue of what to do with the grass clippings once they are collected. In the past, the grass clippings could simply be set out with the other household trash. Recently, however, many municipalities have started to charge additional fees for handling grass clippings, and some are even requiring the homeowner to take the grass clippings to a central depository on his or her own. Particularly in the spring and early summer, grass clippings can make up a fairly large percentage of the solid waste being deposited in land fills. Thus, from a variety of standpoints it may be desirable to reduce "bagged" grass clippings. This must be balanced against the desire of many homeowners to have a very "formal" looking lawn substantially devoid of grass clippings. Bagging is unquestionably desirable when cutting very lush, long and/or damp grass, at least from the standpoint of aesthetics, but there are times when bagging is simply unnecessary, and side discharging or mulching might be adequate.

Mulching is the third general way to handle grass clippings. In mulching it is desirable to cut the clippings to as short a length as possible to ensure that the clippings are small enough to be driven beneath the surface of the standing grass blades, down to the soil. It is also desirable to violently agitate the grass as it is being cut to again facilitate deposit of the clippings below the lawn surface. Mulching of grass clippings clearly possesses several advantages. For example, it is much faster and easier to mow a lawn when the grass is not being bagged. The lawn mower is much lighter and it is unnecessary to stop every five minutes to one-half hour to empty the bag. Also, since no grass clippings are collected, the homeowner does not have to worry about solid waste disposal charges or responsibilities. Mulching minimizes thrown object risks as well: most mulching mowers do not have a discharge chute through which to throw rocks, etc.

However, there may be times when mulching is undesirable. For example, if the grass is quite long, lush and/or damp, it may be desirable to bag or side discharge the grass to avoid grass clumping, an effect which to some degree is unavoidable when using even efficient mulching mowers. Thus, it may be desirable to bag or side discharge the grass clippings in the spring and early summer, but mulch the rest of the year, or perhaps to bag when the grass is medium length, side discharge when the grass is extremely long, but mulch otherwise. Or, it might be appropriate to bag the clippings regardless of the length of the lawn to minimize the dissemination of weed seeds if the lawn harbors various broad leaf weeds, for example.

Therefore, it is clear that there are times when it would be very desirable to bag grass clippings and times when it would perhaps make more sense to mulch or side discharge the grass clippings, depending on weather conditions, local rules and regulations concerning grass clippings, time between mowings, and grass conditions, among other things. However, prior art mowers, whether baggers, side dischargers or mulchers, cannot easily be converted from one mode of mowing to another. Manufacturers have certainly offered bagging mowers that have discharge chute doors which can be closed to theoretically convert the mower to a mulcher, but such mowers tend to clog in the mulching mode and generally do not do a very good job of mulching.

One common type of mulching mower includes a deep deck housing, without a discharge chute, and a special mulching blade which has a longer than normal cutting edge and a severely stepped or offset configuration which are presumably provided to allow the cutting blade to repeatedly impact and cut the grass clippings to render them small enough to penetrate the surface of the standing grass. Since "dedicated" mulching mowers of this type do not include a chute, they obviously cannot be used to bag the grass clippings irrespective of weather conditions, length, lushness or dampness of the grass, etc. As noted above, another type of "mulching mower" is a standard bagging mower having a spring-loaded door for selectively blocking the discharge chute. When the door is open the grass bag is mounted to the mower. When the grass bag is removed the door automatically closes and, in theory, the lawn mower can be used to mulch. While in principle this would seem to be a very logical way to bag or mulch, on demand, it turns out that the housings of most bagging lawn mowers are not designed to accommodate mulching. Instead, they are designed to entrain a large amount of air to transport the clippings through a discharge chute and into the grass bag. When the standard bagging lawn mower is attempted to be used as a mulcher, the blade and housing actually create too much air flow and tend to flatten the grass blades rather than cut and mulch them. And, such mowers tend to clog, causing the clippings to fall from the housing in clumps.

It has been discovered that guide vanes or "kickers" mounted in the mower cutting chamber can greatly improve mulching performance. The kickers, guide vanes or baffles mounted within the cutting chamber essentially disrupt the stream of grass clippings suspended therein and direct the clippings generally downwardly and/or inwardly into the cut path. The kickers in combination with proper housing and blade design provide excellent clipping dispersion under varying lawn conditions. One type of mulching mower with kickers, shown and described in U.S. Pat. No. 4,205,512, assigned to the assignee herein, was offered by The Toro Company in the late 70's and early 80's. The Toro walk-behind mulching mower was a "dedicated" mulcher as it did not include a discharge chute and was not capable of bagging the grass clippings. Toro also offered a mulching kit for a riding lawn mower which included a discharge chute cover and a plurality of kickers which could be mounted within the cutting chamber, but in order to convert the lawn mower from a non-mulcher to a mulcher, many steps were required, including detaching the deck from the traction vehicle, securing the discharge chute cover with fasteners, removing a baffle mounted in the housing, and attaching the "kickers." To convert from a mulcher to a non-mulcher the steps had to be reversed.

Another manufacturer offers a "Mulcherizer Kit" for its walk-behind rotary lawn mowers. Reference is made to U.S. Pat. No. 4,189,903, which discloses this kit. It includes a plastic liner having roughly the same shape as a lawn mower housing having integrally molded guide vanes or kickers. The liner attaches to the underside of the housing and blocks the discharge chute, thus converting the lawn mower into a mulcher. A special mulching blade is also used in lieu of the standard bagging blade. To return to the bagging mode, the mulching blade and liner are removed, and the standard bagging blade is reconnected. Obviously, the Mulcherizer Kit of the '903 patent does not allow the operator to easily convert from bagging to mulching and vice versa.

One aspect of the present invention addresses the problems discussed above. Specifically, one aspect of the present invention relates to a convertible lawn mower which can be easily converted from a bagger to a mulcher and vice versa, depending on weather conditions, grass conditions, and other factors; and specifically relates to a discharge chute blocking device which effects this conversion.

Another aspect of the present invention relates to a method and apparatus for cleaning the underside of a rotary mulching mower, to remove accumulated grass clippings and the like. It is well known that grass clippings tend to accumulate under the decks of rotary mowers. That is, clippings, which are in large part water, tend to adhere to the top and side walls of the deck, forming an oftentimes thick coating of agglomerated clippings. Since clippings are not immediately discharged from a mulching mower, but instead are repeatedly cut to reduce the clippings size, grass clippings accumulation is particularly troublesome for such mowers. It is believed that accumulated grass clippings (on the underside of the deck) can diminish the cutting and/or mulching efficiency of rotary mowers, and this aspect of the present invention is directed toward solving this problem.

In previous attempts to solve the above-noted clippings buildup problem, manufacturers included wash-out ports in the mowing decks. The typical wash-out port was simply an opening, about one-half inch to one inch in diameter, located in the top wall of a deck and configured to receive water from a conventional garden hose. After starting the mower the operator would typically position a conventional garden hose such that the hose outlet fitting juxtaposed the wash-out port. The spinning blade would distribute water throughout the underside of the deck and after a period of time at least some of the accumulated clippings would be washed away. While this simple wash-out port technique worked fairly well, it required a fairly large opening (one-half inch to one inch diameter) in the deck which may have weakened the structure of the deck and/or allowed objects such as small rocks to be thrown out of the confines of the deck, to possibly cause personal injury or property damage. According to current ANSI standards, such a port should be no longer than $\frac{3}{8}$ inch in diameter.

Applicants believe that the clippings accumulation problem is particularly troublesome in the case of a mower having "kickers." As discussed at some length above, kickers are intentionally configured and positioned to intercept clippings and deflect them inwardly and downwardly into the path of the blade so that they can be recut and eventually discharged downwardly through the standing grass blades to the soil surface. Thus, it's clear that grass clippings will tend to accumulate on the kickers and they therefor need to be periodically cleaned. To address the clippings accumulation problem, on mulching and non-mulching mowers, a second aspect of the invention involves a wash-out system which eliminates the need for a wash-out port in the mower deck. More specifically, the second aspect of the invention relates to a discharge chute blocking device which constitutes or incorporates a wash-out system.

SUMMARY OF THE INVENTION

Accordingly, one aspect of the present invention is a rotary convertible lawn mower including a housing defining a cutting chamber having a top wall and a discharge opening for allowing grass clippings to flow out of the housing; a prime mover; a cutting blade coupled to the output shaft of the prime mover; and removable means for selectively blocking the discharge opening to selectively put the mower into its mulching mode, the removable discharge opening blocking means comprising a "kicker member" for deflecting the grass clippings in such a way as to enhance the mulching effect. The kicker member has a "kicker surface" lying generally in a plane oblique with respect to the generally horizontal cutting path established by the rotating blade. The kicker surface is disposed in the path of grass clippings to deflect the clippings generally downwardly into the cutting path when the mower is in its mulching mode, whereby the clippings are deposited beneath the surface of the grass. When the discharge opening of the housing is blocked the mower mulches the grass clippings and when the chute is unblocked a "grass handling means" such as a grass catcher or side discharge attachment can be utilized.

Another aspect of the present invention is a wash-out system for a rotary lawn mower. The wash-out system includes a "removable plug means" for selectively blocking the discharge opening of the mower housing; a "coupling means" connected to and situated on the outside of the plug means for accepting a water hose; a "nozzle means" connected to and situated on the inside of the plug means; and means for operatively connecting the coupling means to the nozzle means to provide fluid communication therebetween. Water from the hose flows through the coupling means, connecting means and nozzle means and injects into the cutting chamber to remove accumulated grass clippings therefrom.

In a preferred embodiment of the wash-out system, the nozzle means includes a nozzle having a nozzle opening which directs the water substantially parallel to the walls of the mower housing. Preferably, there is a pair of nozzle openings producing a pair of oppositely directed streams both of which are substantially parallel to the housing walls.

Although the wash-out system of the present invention can be used with a non-mulching mower, in a preferred embodiment the "plug means" includes a "kicker" to enhance the mulching effect.

The invention will be further described with reference to the appended Drawing which depicts a preferred embodiment of the invention.

BRIEF DESCRIPTION OF THE DRAWING

The invention will be further described with reference to the appended Drawing, in which.

DETAILED DESCRIPTION OF THE PREFERRED EMBODIMENT

Overall Description of Mower

Figure 1A:
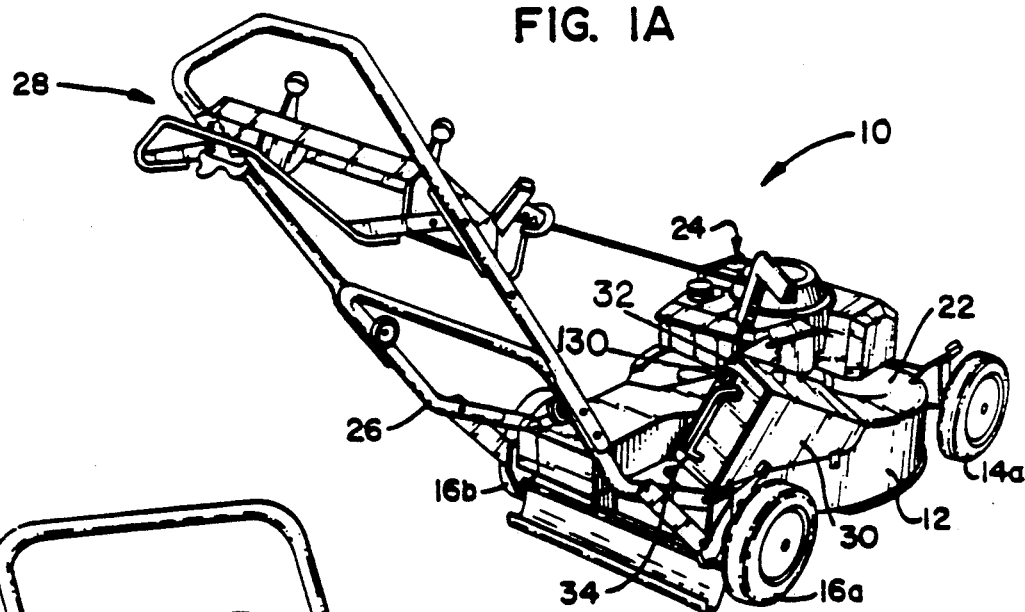
FIG. 1A is a perspective view of a rotary lawn mower of the present invention including a discharge chute plug so as to adapt the mower for mulching.
Figure 1B:
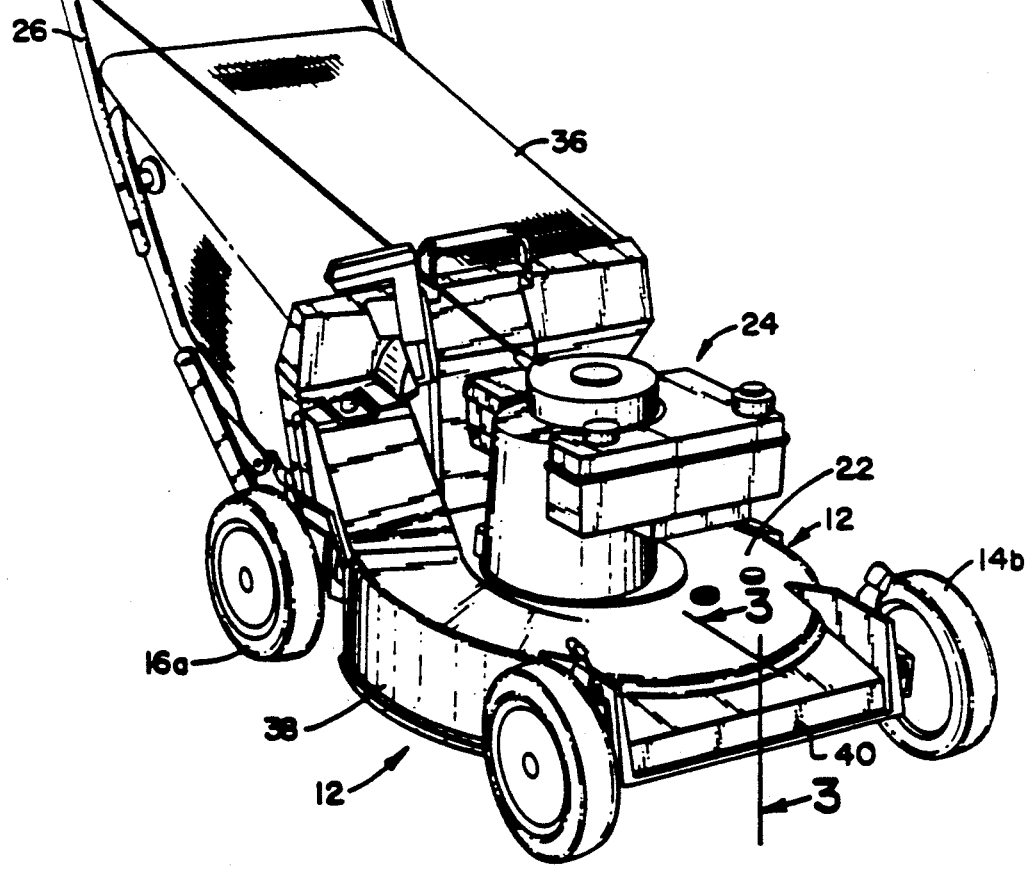
FIG. 1B is a perspective view of the lawn mower of FIG. 1A, with the discharge chute plug removed and replaced with a grass collection bag.
Figure 1C:
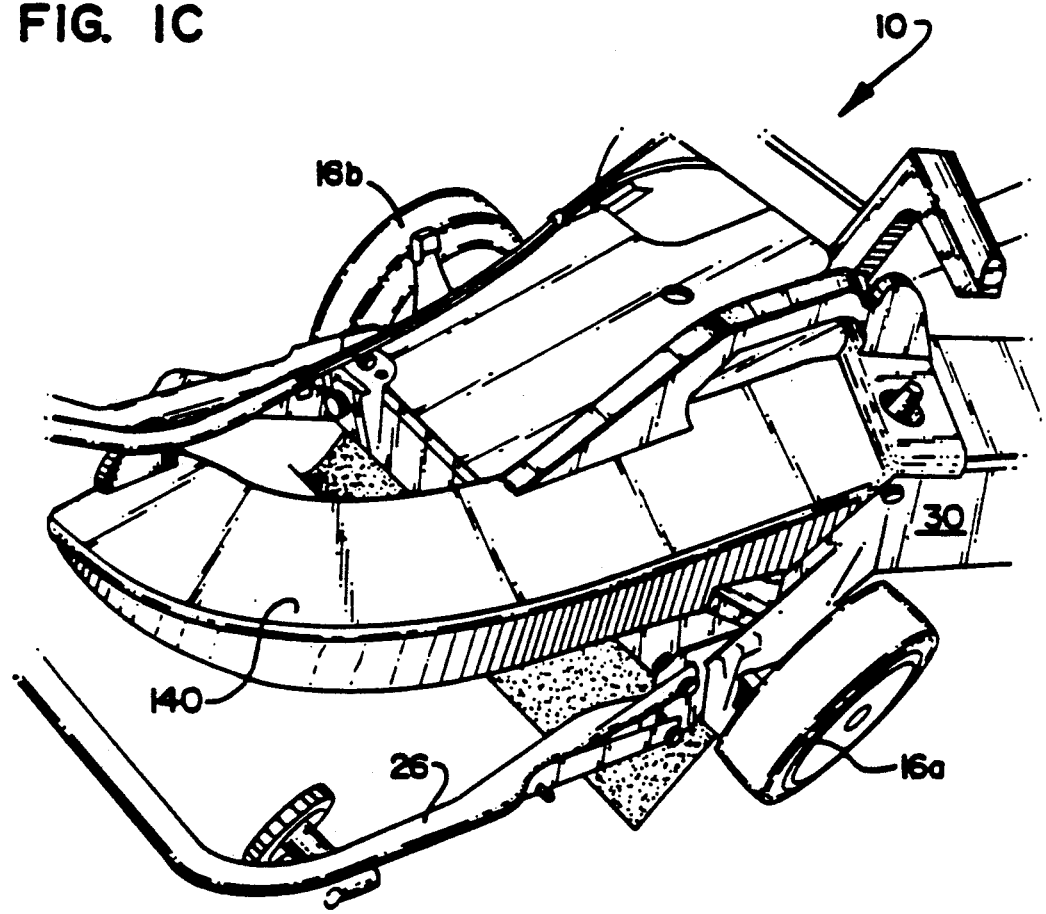
FIG. 1C is a partial perspective view of the lawn mower of FIG. 1A, with the discharge chute plug removed and replaced with a side discharge chute extension.

Referring to the Drawing, wherein like numerals represent like parts and assemblies throughout the several views, a convertible mower of the present invention is shown in perspective in FIGS. 1A, 1B and 1C and is generally designated as 10. FIG. 1A shows mower 10 adapted to mulch; FIG. 1B illustrates mower 10 in the bagging mode; and FIG. 1C shows mower 10 adapted to side discharge. Mower 10 includes a housing 12 supported by a pair of front wheels 14 and a pair of rear wheels 16. Housing 12 has a top surface 22 on which is mounted a conventional internal combustion engine 24. In the embodiment illustrated herein, engine 24 is disclosed as a gasoline engine. However, it is understood that it is within the spirit and scope of the present invention to provide alternative equivalent prime mover blade driving means, such as an electrically-powered motor. Mounted to housing 12 at the rear thereof is a generally vertically and rearwardly extending operator handle 26. Affixed to handle 26 may be the mower controls designated generally as 28.

Mounted toward the right rear corner of housing 12, and adjacent top surface 22, is a discharge chute 30 which is generally inclined upwardly and rearwardly relative to housing 12. Discharge chute 30 is designed to guide grass clippings from housing 12 to some sort of grass receptacle. In FIG. 1A, discharge chute 30 is blocked with a chute plug 32. Discharge chute 30 can have a generally rectangular cross section, as shown in FIG. 1A, and chute plug 32 can have a similar, but smaller, cross section, to allow it to insert easily into and completely block chute 30. Chute plug 32 includes a handle 34 which can be grasped by the operator to allow him or her to easily guide chute plug 32 into or out of engagement with discharge chute 30. Referring to FIG. 1B, if it is desirable to bag rather than mulch, chute plug 32 can be removed and replaced with a bag 36. It should be noted that mower 10, with the exception of chute plug 32 and some additional mulching components described below, generally corresponds to a self-propelled rear bagging rotary lawn mower sold by The Toro Company, assignee herein, as model number 20631.

It should be noted that the Toro model 20631 lawn mower, absent plug 32 and the other mulching components described below, is a conventional rear-bagging lawn mower. Like many rear-bagging rotary mowers, it can normally function as a bagger and even as a side discharge mower, with the addition of a curved chute extension (not shown) which can attach to chute 30 in lieu of bag 36. Such an extension is designated with reference numeral 140 in FIG. 1C. The present invention is particularly directed to rendering a bagging lawn mower convertible such that it can either bag, throw or mulch the "grass clippings" as desired. It should also be noted that mower 10 is capable of mowing and bagging, throwing or mulching a wide variety of vegetation, including but not limited to grass and leaves, but for the sake of brevity the mowing, bagging, throwing and mulching of grass alone are primarily discussed.

Figure 2:
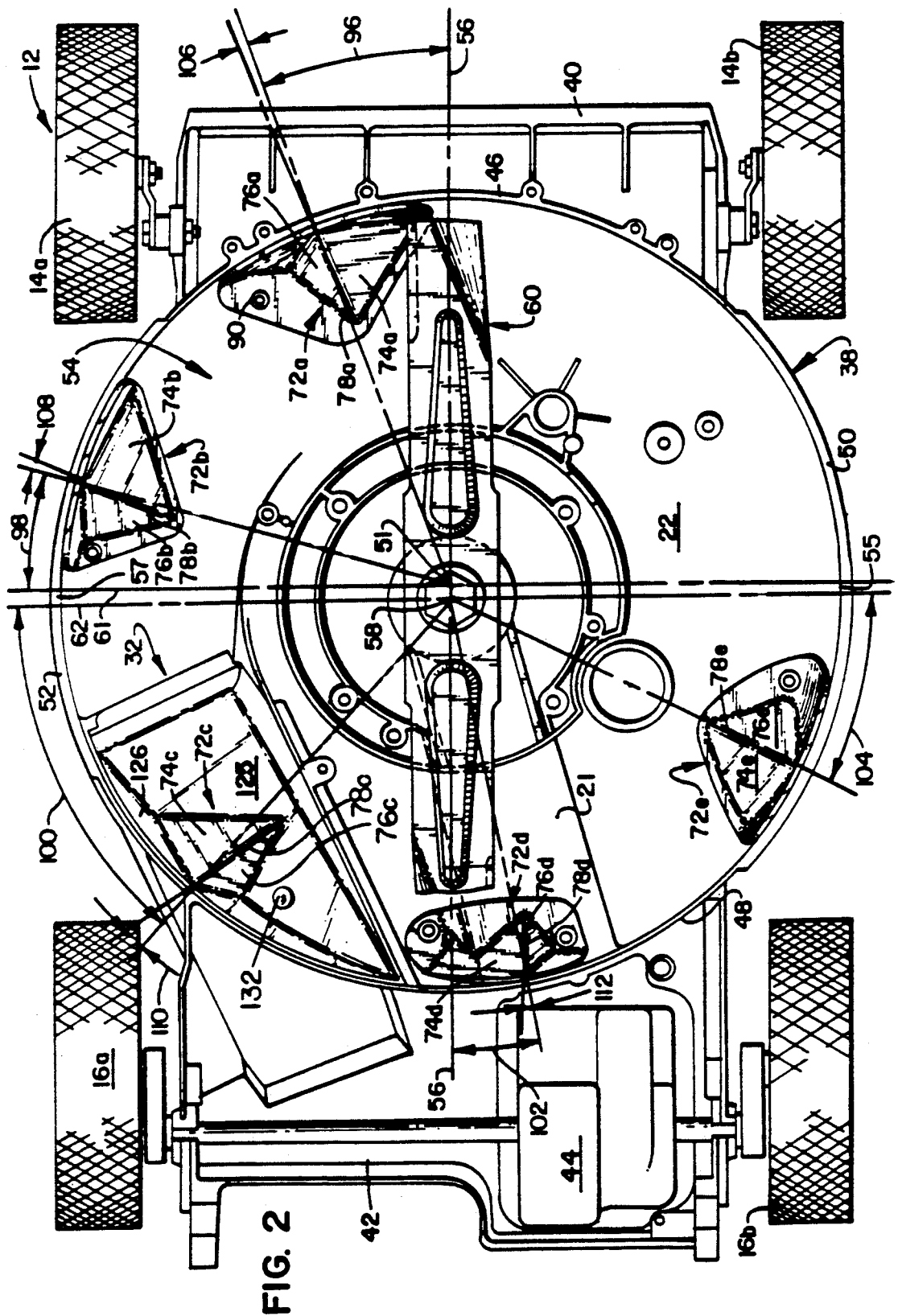
FIG. 2 is a bottom plan view of the mower shown in FIG. 1A.

Referring in particular to FIG. 2, a bottom plan view, the structure of housing 12 will now be broadly described. Housing 12 has a central deck 38, a front deck 40 and a rear deck 42. Front deck 40 rotatably supports front wheels 14, whereas rear deck 42 rotatably supports rear wheels 16. Actually, wheels 14 and 16 are preferably attached to height adjustment mechanisms or the like, rather than directly to housing 12, but such height adjustment means are not particularly germane to the present invention. Rear deck 42 also carries a self-propel transmission 44 which selectively drives rear wheels 16 and which in turn is driven by engine 24 via a belt and pulley system. It will be understood that the present invention is not in any way limited to a self-propelled lawn mower, however. In fact, the present invention is not limited to walk-behind mowers, either, it being equally applicable to riding lawn mowers and lawn tractors having rotary cutting units.

Curved front and rear cutting chamber enclosure members 46 and 48, respectively, extend vertically downwardly from top surface 22 of housing 12. Front deck 40 is connected to and extends forwardly from front chamber enclosure member 46, and in like manner rear deck 42 extends rearwardly from rear cutting chamber enclosure member 48. Central deck 38 has roughly cylindrical sidewalls 50 and 52 which span between front and rear enclosure members 46 and 48. Sidewalls 50 and 52 and enclosure members 46 and 48 combine, along with top surface 22, to make a generally cylindrical cutting chamber 54 in the nature of an inverted shallow pan. Cutting chamber 54 is preferably not precisely cylindrical, however. As well known to those skilled in the art of mower housing design, there are typically "flat spots" 55 and 57 centrally located on sidewalls 50 and 52, respectively, of mower housing 12. Flat spots 55 and 57 can be anywhere from 0.25 inch to 3.00 or more inches long. Referring to FIG. 2, this configuration actually establishes two reference points proximate the center of the roughly cylindrical cutting chamber 54, designated as reference points 51 and 58, reference point 51 being the forward reference point and reference point 58 being the rearward reference point. The vertical axis of the output shaft of the engine would typically be located at reference point 58. Passing fore-and-aft through reference points 51 and 58 is a mower longitudinal axis 56, about which cutting chamber 54 is symmetrical in a very gross sense. A forward transverse axis 61, perpendicular to longitudinal axis 56, passes through forward reference point 51, and a rearward transverse axis 62, also perpendicular to longitudinal axis 56, passes through rearward reference point 58.

Although cutting chamber 54 is not precisely circular, as discussed above, it generally has a diameter of about 21 inches, at least for the Toro model 20631 mower. Sidewalls 50 and 52 and front and rear enclosure members 46 and 48 have vertical dimensions of about 3½ inches. These dimensions are consistent with a farily typical Toro rear-bagging lawn mower. The depth of cutting chamber 54 preferably varies about its circumference in a known manner to create the air flow necessary to convey the grass clippings into bag 36 when mower 10 is in its bagging mode.

Blade 60

Mounted to the output shaft of engine 24 for rotation about a substantially vertical axis within cutting chamber 54 is a cutting blade 60. Blade 60 has a radius slightly smaller than the radius of curvature of sidewalls 50 and 52 and vertical enclosure members 46 and 48 to provide clearance between the tips of blade 60 and the curved surfaces which combine to make roughly cylindrical cutting chamber 54. With reference to the bottom plan view shown in FIG. 2, blade 60 is rotatably driven in a counterclockwise direction.

Figure 6A:
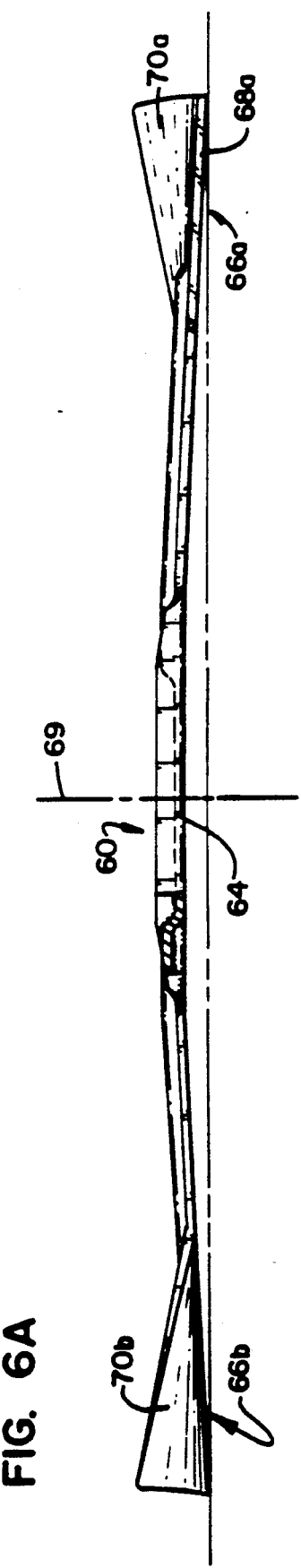
FIG. 6A is an elevational view of a preferred rotary blade for the lawn mower of FIG. 1.
Figure 6B:
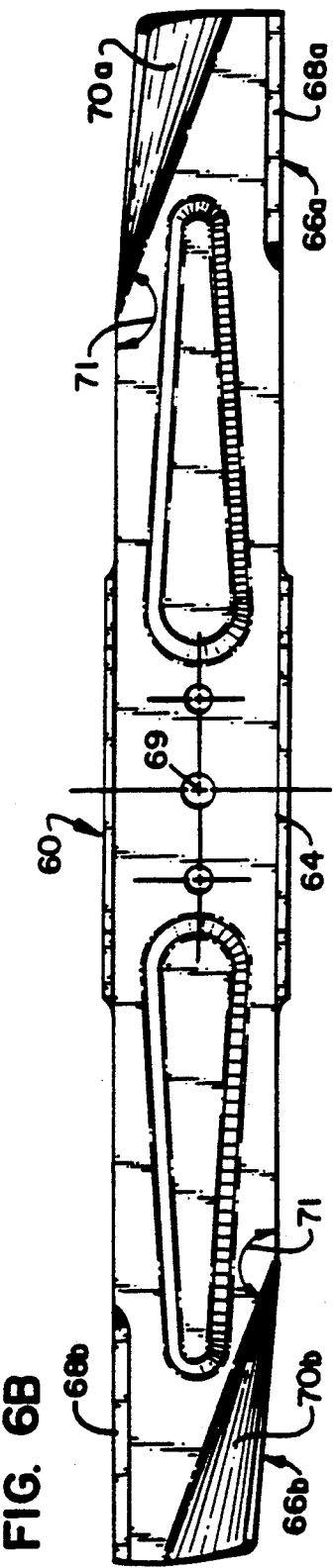
FIG. 6B is a top plan view of the rotary blade of FIG. 6A.

Referring to FIGS. 6A and 6B, which show blade 60 removed from cutting chamber 54, blade 60 includes a central portion 64 and end portions 66a and 66b. Each end portion 66a or 66b includes a cutting edge 68a or 68b extending at least about one-third of the way to the center of the blade along one side thereof. Each end portion 66 also includes a sail 70a or 70b disposed on the opposite side of the blade from the corresponding cutting edge 68a or 68b. Blade 60 is symmetrical about a central (vertical) axis 69 such that cutting edge 68a is located on the opposite side of the blade from cutting edge 68b; likewise, sail 70a is on the opposite side of the blade from sail 70b. This is obviously necessary to allow efficient cutting of grass upon the high speed rotation of blade 60 about its central axis 69.

FIG. 6B is a top plan view of blade 60 such that sails 70 in effect extend up and out of the plane of the paper. Sails 70 are triangular in shape, having one side of the triangle in the plane of the blade and angled with respect to both the sides of the blade and the tips of the blade. The angle that each sail 70 forms with the sides of the blade is preferably about 160°, this angle being designated 71 in FIG. 6B. Sails 70 extend upwardly and rearwardly (with respect to their corresponding cutting edges 68) so as to form an angle with the generally planar remaining blade portion of about 105°. Sails 70, like cutting edges 68, preferably extend roughly one-third of the way from the blade tips to the center of the blade. Blade 60 is preferably formed from a single rectangular piece of steel. Sails 70 are made simply by upwardly bending diagonally-opposite corners of the blade.

Blade 60 is unique in that its sails 70 are quite long (measured from the blade tip radially inwardly) as compared to its cutting edges 68. On the prior Toro "VDM" blade, for example, the blade normally used on the model 20631 mower, the sails are much shorter in relation to the cutting edges. Also, sails 70 are more pronounced, vertically, than those of a "typical" blade. A normal blade would be represented by Toro's "VP" blade which has a relatively vertically short sail. The VDM sail is taller than the VP sail, but not nearly as long, as discussed above. Blade 60 is, in rough terms, a blend of the VDM and VP blades. It operates partly on a pneumatic and partly on a mechanical principle. That is, it pumps air to pneumatically circulate the grass clippings while also, it is believed, mechanically impacts or "slaps" the grass clippings to force them outwardly to allow mulching to proceed.

Kickers 72

Mounted within cutting chamber 54 is a plurality of "kickers" which assist in the mulching process. Referring to FIG. 2, there is a front kicker 72a; a right side kicker 72b; a plug kicker 72c; a rear kicker 72d; and a left side kicker 72e. While front kicker 72a, rear kicker 72d and side kickers 72b and 72e are mounted directly to housing 12, and are intended to remain in the housing whether mower 10 is used in the mulching, bagging or side discharge mode, plug kicker 72c is an integral component of chute plug 32 and therefore is removed along with plug 32 when bag 36 is to be utilized.

Figure 3:
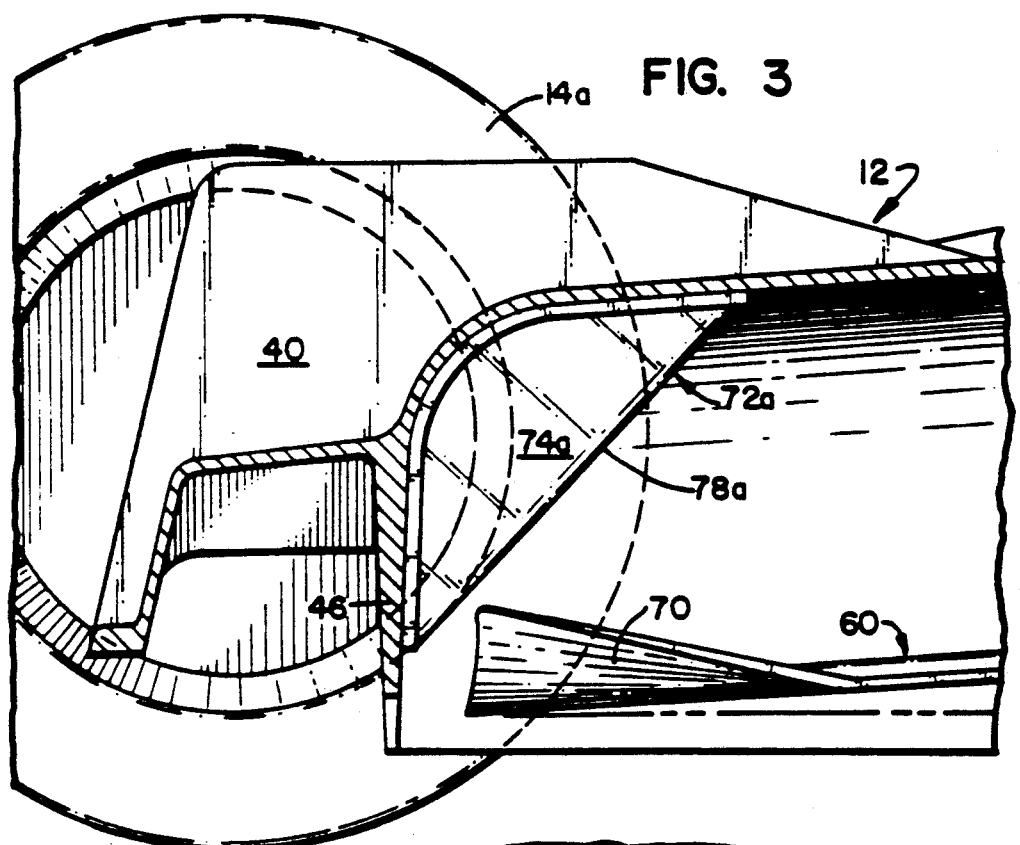
FIG. 3 is an enlarged fragmentary sectional view taken generally along line 3—3 of FIG. 1, showing an enlarged elevational view of one of the preferred "kickers"

Kickers 72 are vertically disposed above the cutting path of blade 60 and, as will be described in more detail hereafter, in the path of clippings suspended in cutting chamber 54. Reference is made to FIG. 3, a fragmented enlarged sectional view of housing 12, front cutting chamber enclosure member 46, and related components. It can be seen that front kicker 72a is disposed slightly above the uppermost tip of blade sail 70. It is preferred that the spacing between the upper tips of the blade sails and kickers 72 be adequate to allow clearance between these components even when blade 60 flexes due to, for example, impact with a rock.

Although there are certainly differences between the various kickers 72 mounted within cutting chamber 54, there are similarities as well. For example, each kicker includes an oblique or canted surface which is generally triangular in shape angling downwardly from top surface 22 of housing 12, and slightly inwardly toward the center of cutting chamber 54. This oblique surface, which can be called the "kicker surface," is designated with the reference numeral 74 on each kicker 72. That is, for example, front kicker 72a includes kicker surface 74a, and so on. Kicker surfaces 74 are designed to intercept the grass clippings rotating within cutting chamber 54 and deflect them downwardly and inwardly through the blade plane and even through the standing grass blades, so that the clippings can reach the soil where they can do the most good.

Supporting each kicker surface 74 is a roughly triangular back surface 76. Corresponding surfaces 74 and 76 join to form an inclined edge 78, and the preferred angle between corresponding surfaces 74 and 76 is about 90°, although this angle is not believed to be critical to the performance of mower 10. Thus, referring to front kicker 72a, kicker surface 74a and back surface 76a join to form an inclined edge 78a. As can be seen in FIG. 3, a fragmentary sectional view of a portion of housing 12, kicker 72a is supported horizontally by top surface 22 and supported vertically by front chamber enclosure member 46. Kicker 72a is therefore in the nature of a triangle (in elevational view), having roughly equal horizontal and vertical legs. Side kickers 72b and 72e and plug kicker 72c are very similar in size, shape and structure to front kicker 72a.

Figure 4:
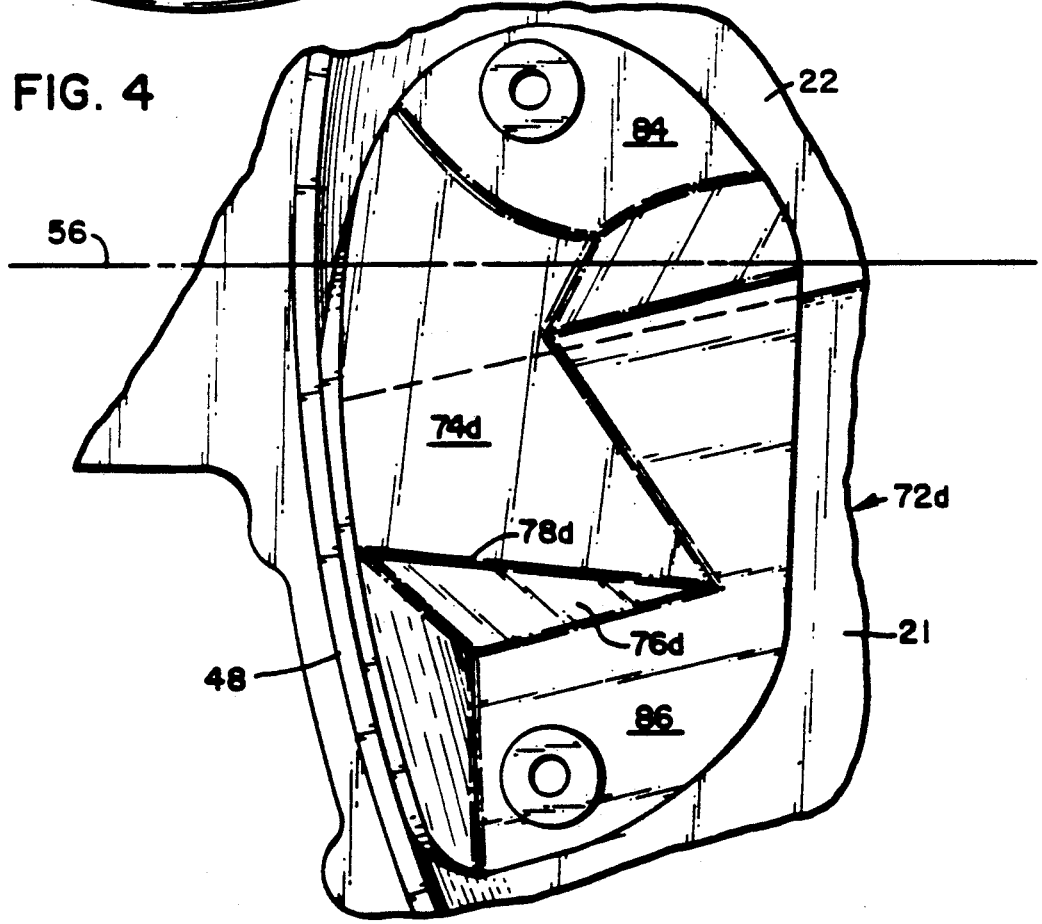
FIG. 4 is an enlarged bottom plan view of one of the kickers of the preferred embodiment of the present invention.

Rear kicker 72d is somewhat unique because it has to accommodate a channel 21 in top surface 22 which accommodates the drive belt going from engine 24 to self-propel transmission 44. FIG. 4 shows an enlarged bottom plan view of rear kicker 72d. Mower longitudinal axis 56 is included in FIG. 4 to assist the reader. As can be seen, kicker surface 74d is in the nature of a five-sided generally planar surface. It should be noted that surface 74d would be extending out of the plane of the paper were FIG. 4 a three dimensional representation of kicker 72d. That is, inclined edge 78d, and specifically the left most end of edge 78d, would be the closest point to the reader. The back surface 76d of rear kicker 72d is roughly triangular in shape. There is a "leading" horizontal kicker surface 84 above (in FIG. 4) the leading or topmost (in FIG. 4) edge of kicker surface 74d. Similarly, there is a "trailing" horizontal kicker surface 86 which is "below" the trailing edge of kicker back surface 76d. Horizontal kicker surfaces 84 and 86 are apertured to receive self tapping threaded fasteners which secure kicker 72d to top surface 22 of housing 12. Trailing horizontal surface 86 is actually offset somewhat from leading horizontal surface 84 to accommodate belt channel 21. Of course, if belt channel 21 were omitted, in a manually-propelled lawn mower, for example, then there would be no need for such a complex kicker configuration as shown in FIG. 4, and kicker 72d could be more like kickers 72a, 72b, 72c and 72e.

It should be noted that kicker surfaces 74a could be generally planar as shown in the Drawing or, alternatively, could spiral inwardly toward the center of cutting chamber 54 to a degree. Preferably, kicker surfaces 74 are generally planar and are oblique or canted such that they form a compound angle with top surface 22. In broad terms, kicker surfaces 74 face downwardly and inwardly so as to "kick" the grass clippings downwardly and inwardly. It has been found that this orientation of kicker surfaces 74 produces the best results in terms of literally driving the grass clippings through the blade plane and standing grass.

Figure 5:
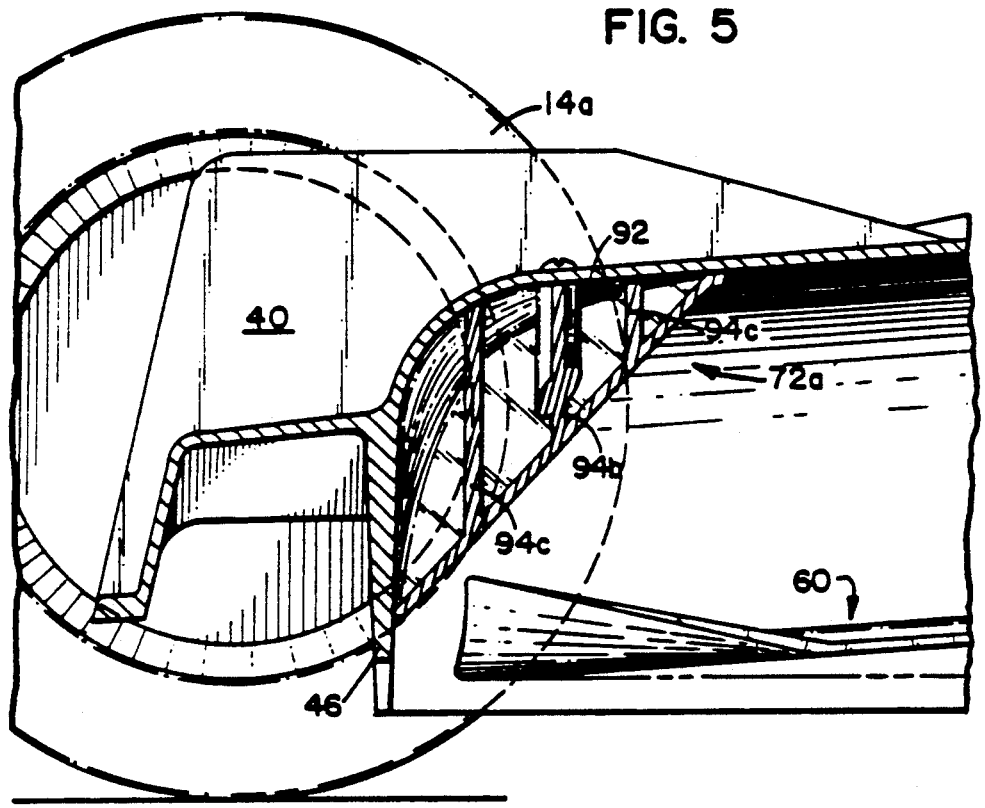
FIG. 5 is an enlarged fragmentary sectional view much like FIG. 3 except that the kicker is sectioned as well.

With the exception of plug kicker 72c, kickers 72 are secured using standard threaded fasteners. Kickers 72a, 72b, 72d and 72e each include two apertured bosses suitable for receiving self tapping screws inserted through top surface 22 of housing 12. Referring for example to front kicker 72a, there is a "trailing" boss 90 proximate back surface 76a; and a "leading" boss 92 on the kicker surface side of inclined edge 78a. Leading boss 92 is not visible in FIG. 2 inasmuch as it is actually beneath the structure formed by surfaces 74a and 76a, but can be seen in FIG. 5, a sectional view of front kicker 72a. FIG. 5 also illustrates a plurality of stiffening webs 94a-94c formed in the underside of kicker 72a. Webs 94 give kicker 72a the structural strength needed to withstand rock impacts, for example. The preferred material for kickers 72 is polyethylene, although certainly any suitable alternative could be used. Kickers 72, and entire chute plug 32, are preferably injection molded.

Referring again to FIG. 2, the preferred circumferential locations of kickers 72 can now be described. The angular locations of kickers 72 will be described in terms of the angular locations of the lowermost (or outermost) points of inclined edges 78. Front kicker 72a is preferably located at about 20° from mower longitudinal axis 56, this angle being designated with the reference numeral 96 in FIG. 2. Right side kicker 72b is preferably at about 15° from forward transverse axis 61, this angle being labelled 98 in FIG. 2. Plug kicker 72c is preferably about 48° from the rearward transverse axis 62, this angle being labelled 100. Rear kicker 72d is preferably about 9½° from longitudinal axis 56, this angle being designated as 102 in FIG. 2. Finally, kicker 72e is preferably about 26° from rearward transverse axis 62, this angle being labelled 104 in FIG. 2. The positions of kickers 72 about the circumference of cutting chamber 54 are a function of a variety of factors, including the overall housing design and blade design. The locations of kickers 72 were chosen to eliminate windrowing along sidewalls 50 and 52 of the mower as it traverses a cutting path. Likewise, the number and shape of kickers 72 would be, in part, a function of the blade design and overall housing design and are selected to eliminate windrowing or "blowout" of grass clippings. That is, the primary function of kickers 72 is to deflect the grass clippings inwardly and downwardly with enough energy to penetrate the top surface of the standing grass blades. Without kickers 72, in light of the fact that discharge chute 30 is blocked off with chute plug 32, the grass clippings would tend to somewhat randomly escape from the sides of cutting chamber 54, causing windrowing.

It should also be noted that inclined edges 78a are preferably not perfectly radially oriented. Referring again to FIG. 2, inclined edge 78a is preferably about 1° "forward" of a radial, this angle being designated 106; inclined edge 78b is preferably about 8° "behind" a radial, this angle being labelled 108; inclined edge 78c is preferably about 7° behind a radial, this angle being labelled 110; inclined edge 78d is about 8° behind a radial, this angle being labelled 112; and inclined edge 78e is for all intents and purposes radially disposed.

Chute Plug 32

Figure 7:
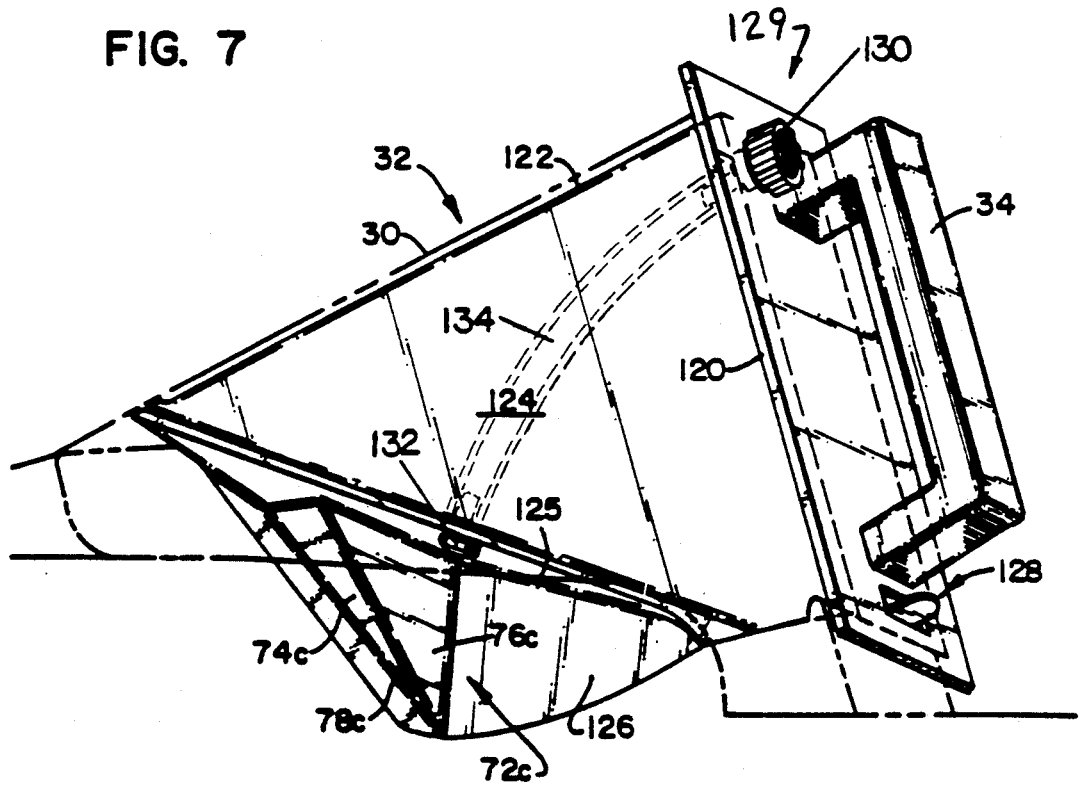
FIG. 7 is a perspective view of a discharge chute plug for the lawn mower of FIG. 1, with the housing and discharge chute shown in dashed line.
Figure 8:
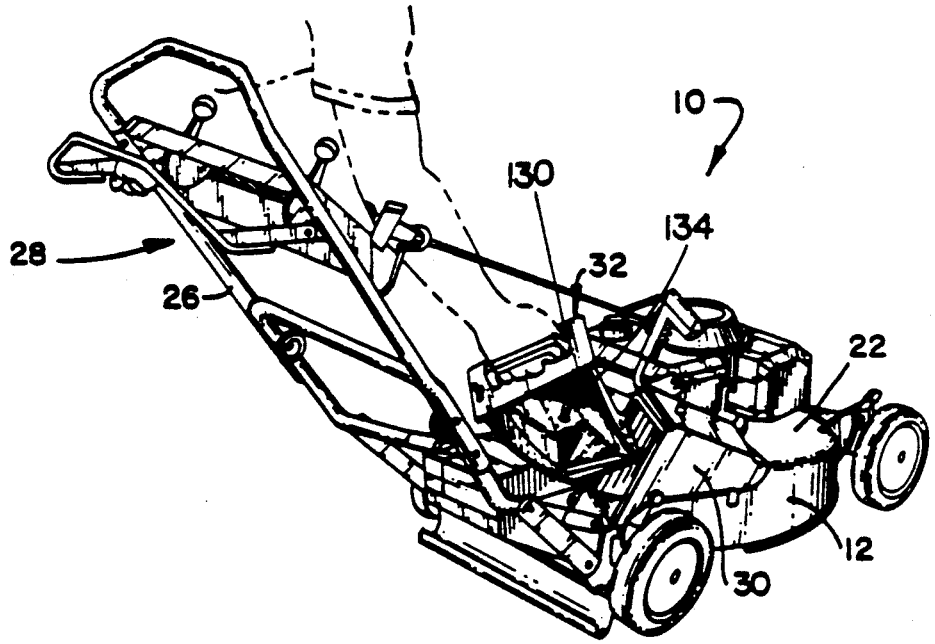
FIG. 8 is a perspective view of the lawn mower of FIG. 1, showing how the discharge chute plug is engaged or disengaged with the discharge chute of the mower.
Figure 9:
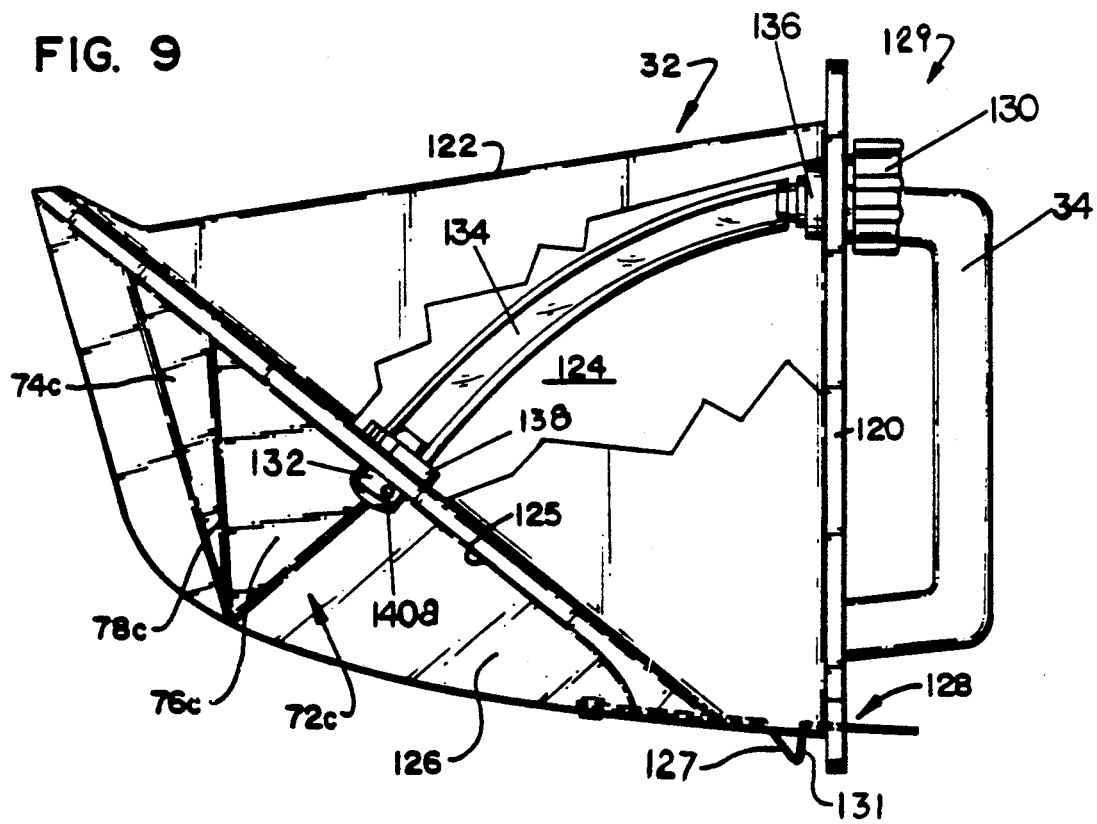
FIG. 9 is an elevational view of a preferred discharge chute plug according to the present invention.

Reference is now made to FIGS. 7, 8 and 9 which show chute plug 32 in greater detail. Chute plug 32 is preferably substantially made of a single piece of injection molded plastic. Handle 34 is attached to a rear wall 120 which in turn is attached to a more or less three-sided structure formed from a roughly rectangular top wall 122; a substantially triangular and planar sidewall 124; and a bottom wall 125 which actually forms a portion of the base structure for plug kicker 72c. Walls 122, 124 and 125 combine to form a structure having a generally rectangular cross section suitable for completely blocking off chute 30. Referring in particular to FIG. 9, the side opposite from that shown in this figure is "hollow." This can be seen better in FIG. 8, which shows the hollow side of chute plug 32. A hollow configuration allows the part to be readily injection molded. Referring to FIG. 7, the roughly vertical supporting wall for kicker 72c is designated with reference numeral 126.

Mounted toward the rear edge of bottom wall 125 and extending through an aperture in rear wall 120 is a metal spring clip 128. Spring clip 128 is secured preferably using standard fasteners at its forwardmost point (left most point in FIG. 9) and is configured to bend upwardly when upward pressure is applied to the rearwardmost (rightmost in FIG. 9) point. Spring clip 128 includes roughly at its midpoint an inclined surface 127 and, immediately adjacent thereto, a catch surface 131 parallel to rear wall 120. As chute plug 32 is being inserted into discharge chute 30, inclined surface 127 eventually makes contact with the lower rearward edge of discharge chute 30, which causes spring clip 128 to move upwardly. Once chute plug 32 is substantially fully inserted, spring clip 128 snaps downwardly into its resting position (that shown in FIG. 9) and catch surface 131 bears against the lower edge of discharge chute 30 to secure plug 32 therein. To remove plug 32 from chute 30, it is simply necessary to push spring clip 128 upwardly and, using handle 34, pull plug 32 out of engagement with chute 30.

The precise configuration of chute plug 32 will of course depend largely on the shape and size of the discharge chute 30. The important aspects of chute plug 32 are that it securely block the discharge chute 30 and accurately position plug kicker 72c within cutting chamber 54.

Wash-Out System 129

Another aspect of the invention is a clippings wash-out system 129 which can be incorporated into plug 32. Referring to FIG. 9, wash-out system 129 preferably includes a female hose coupling 130 located on the handle side of rear wall 120 toward the top thereof. A nozzle 132 is positioned on the kicker side of wall 125, preferably on the "downstream" side of plug kicker 72c. That is, nozzle 132 is preferably proximate the kicker back surface 76c as opposed to the kicker front surface 74c of plug kicker 72c. The rationale for his preferred location for nozzle 132 will be discussed below.

A tube 134, preferably made of flexible plastic, provides fluid communication between hose coupling 130 and nozzle 132. Actually, in the preferred embodiment there is a back fitting 136 located on the opposite side of rear wall 120 from female coupling 130; and a similar front fitting 138 located on the opposite side of wall 125 from nozzle 132. Fittings 136 and 138 preferably include barbed male elements which can insert into the opposite ends of hose 134. Back fitting 136 is connected to and fluidly communicates with hose coupling 130; whereas front fitting 138 is connected to and fluidly communicates with nozzle 132.

Figure 11:
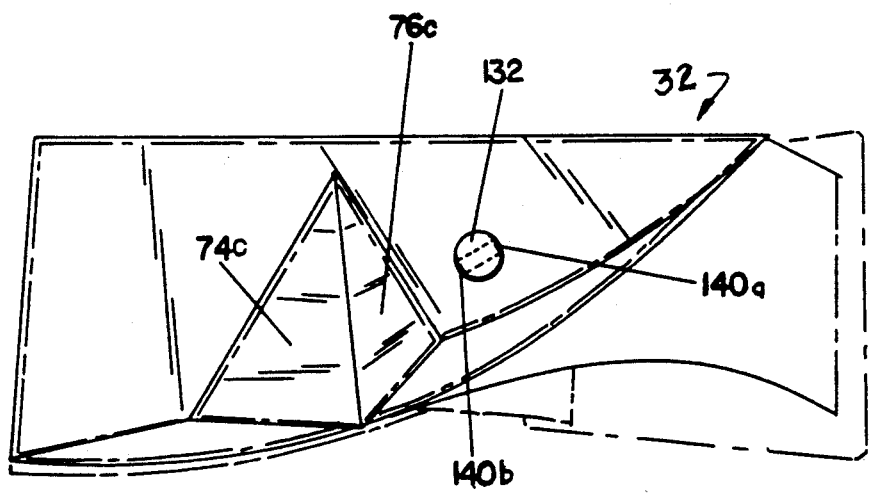
FIG. 11 is a bottom plan view of a preferred discharge chute plug.

While nozzle 132 could be any type of water outlet suitable for injecting one or more streams of water toward the underside of blade housing 12, in the preferred embodiment nozzle 132 causes the water to flow substantially parallel to plug wall 125 and housing walls 22, 50 and 52. It is thought that inject the water parallel to the underside of the deck as opposed to injecting the water at the spinning blade creates more efficient scrubbing action. Thus, nozzle 132 in its most preferred embodiment includes two diametrally opposed nozzle openings 140a and 140b, as shown in FIG. 11, both of which inject water parallel to the housing walls. Nozzle opening 140a is directed away from kicker back surface 76c whereas nozzle opening 140b is directed toward kicker back surface 76c. It is believed that this nozzle configuration results in the greatest scrubbing action, but other nozzle configurations are contemplated by this invention. Thus, in the preferred embodiment nozzle 132 receives the flow from tube 134 axially (perpendicular to plug wall 125) and directs the flow radially (parallel to plug wall 125) through the nozzle openings 140a and 140b. A nozzle of this type can be easily constructed by making a central axial opening and then adding a perpendicular passage, thus making a "T" fitting of sorts. The two outlets of this perpendicular passage constitute the nozzle openings 140a and 140b.

As noted above, nozzle 132 is preferably located toward the back surface 76c of kicker 72c. This results in nozzle 132 being protected by kicker 72c from rocks, etc., which might be thrown by blade 60 as it is spinning during the wash-out process. The invention certainly contemplates locating the outlet nozzle in other locations, however. Furthermore, the invention contemplates using such a wash-out system with mulching or non-mulching mowers. Even though mulching mowers as a class probably accumulate more grass clippings faster than non-mulching mowers, it's clear that even non-mulching mowers need cleaning on a regular basis.

In a preferred embodiment, the inside diameter of tube 134 is about ½ inch and the diameter of nozzle openings 140a and 140b is about 7/32 inch.

Operation

The operation of mower 10 can now be summarized. Kickers 72 would normally be installed at the factory or by a dealer. Once installed, kickers 72a, 72b, 72d and 72e are not intended to be removed, at least in the preferred embodiment. If the operator wishes to mulch the grass clippings, he or she inserts chute plug 32 into discharge chute 30 as shown in FIG. 8. As noted above, once chute plug 32 is fully inserted, spring clip 128 prevents its inadvertent removal during the mulching operation. Chute plug 32 can remain in discharge chute 30 until such time as it is desired to bag (or side discharge) the grass clippings, at which time spring clip 128 is manipulated to release chute plug 32 and chute plug 32 is withdrawn from discharge chute 30. Then, bag 36 or side discharge chute 140 can be attached to housing 12 to allow mower 10 to bag or side discharge the grass clippings. Again, front kicker 72a, side kickers 72b and 72e, and rear kicker 72d remain in the cutting chamber 54 even during the bagging or side discharging operation. It has been found that these kickers, while contributing greatly to the mulching efficiency of mower 10, have very little negative impact on the bagging ability of mower 10.

The operation of kickers 72 is not precisely known, but it is believed that they intercept the grass clippings rotating about the outer and upper periphery of cutting chamber 54 and "kick" the clippings inwardly and downwardly. When plug 32 is in place, it is believed that the air flow within chamber 54 is such as to allow the clippings to be literally thrown downwardly through the blade and standing grass blades, ultimately reaching the soil, where they can decompose and add nutrients to same. When plug 32 is removed, there is a large air flow through chute 30 and into bag 36 (or through the side discharge chute extension), this air flow apparently being large enough to entrain the grass clippings and substantially overcome the downward kicking effect of the kickers 72, although it is believed that a portion of the clippings are simultaneously buried, so that even when bagging the operator sometimes has up to 25% fewer clippings to dispose the lawn.

Figure 10:
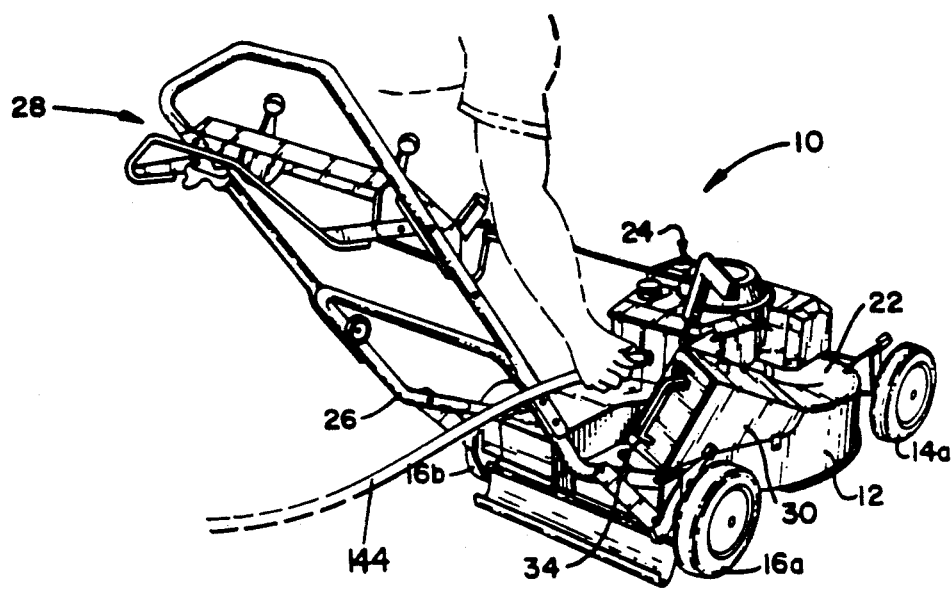
FIG. 10 is another perspective view of the rotary mower of FIG. 1 showing a water hose being attached to the wash-out system incorporated in the discharge chute plug.

Thus, a most preferred mower according to the invention is one which can selectively bag, side discharge or mulch the grass clippings, wherein the conversion from one mode to another can be quickly and easily accomplished. FIGS. 8 and 10 illustrate the use of wash-out system 129. Plug 32 is inserted into chute 30. A hose 144 is connected to female hose coupling 130 and the water is turned on so that is flows through hose 144 and into wash-out system 129. The operator can then assume the normal, safe starting position for mower 10, start the mower and engage the blade. Water flows through hose 144 into coupling 130; is directed from coupling 130 to nozzle 132 by tube 134; and flows out of nozzle 132 through nozzle openings 140a and 140b. The streams which issue from nozzle openings 140a and 140b remove accumulated grass clippings from the underside of housing 12.

It should be noted that wash-out system 129 appears to work better when deck 12 is "sealed" either by positioning it over fairly tall grass or by lowering the deck (through standard height-of-cut adjustment means) to reduce the distance between the lower edge of the deck 12 and the ground surface. By sealing deck 12 in this manner, it is thought that the water tends to reside within the deck for a longer period of time to enhance the scrubbing action.

It should particularly be noted that wash-out systems contemplated by this invention could be used in conjunction with any type of rotary mower and are not limited to a mulching mower or a mower having kickers or similar structures.

The wash-out system of the present invention is believed to be a safe solution to the clippings accumulation problem because the underside of the deck can be thoroughly sprayed with water while the blade is spinning without the need for one or more wash-out ports permanently mounted in the deck. That is, the chute blocking device or plug described herein includes its own wash-out nozzle and this nozzle is removed when the plug is removed. If the plug is left in place during operation of the mower, presumably to convert the mower to a mulching mower, the nozzle does not form a large opening which could allow a rock, etc. to be thrown out of the confines of the deck. As discussed above, in the preferred embodiment plug 32 also includes a kicker 72c which protects the nozzle 132 and makes it even less likely that a rock or the like could escape through nozzle 132. A rock, etc. would have to pass through two walls 125 and 120 in plug 32 to escape the confines of housing 12, thus it is believed that plug 32, with or without wash-out system 124, is quite safe in terms of preventing thrown objects.

There are other modifications which will be apparent to those skilled in the art. For example, kickers 72 could be weldments, or even integrally molded into housing 12. Or, wash-out system 129 could be used in conjunction with a non-mulching mower, as noted above. Accordingly, the scope of this invention will be limited only by the appended claims.

We claim:

1. A rotary convertible lawn mower having a mulching mode and a non-mulching mode, comprising:
    (a) a housing defining a cutting chamber, the housing having a top wall and a discharge opening for allowing grass clippings to flow out of the housing:
    (b) a prime mover having an output shaft:
    (c) a cutting blade disposed within the cutting chamber for rotation about a generally vertical axis and operatively coupled to the prime mover output shaft, the blade being disposed beneath the top wall of the housing and establishing a generally horizontal cutting path; and
    (d) removable means for selectively blocking the discharge opening to selectively put the mower into its mulching mode or its non-mulching mode, the discharge opening blocking means carrying a kicker member, wherein when the discharge opening is blocked the mower mulches the grass clippings and when the discharge opening is unblocked the grass clippings can flow out of the housing through the discharge opening, and wherein the discharge opening blocking means kicker member comprises a kicker surface lying generally in a plane oblique with respect to the generally horizontal cutting path and disposed in the path of the grass clippings to deflect the clippings generally downwardly into the cutting path when the mower is in its mulching mode, whereby the clippings are deposited beneath the surface of the grass.

2. The convertible mower of claim 1, wherein the blade comprises a central portion and a pair of end portions, each end portion comprising a cutting edge and a sail, wherein the sails extend about one-third of the way from the blade tips toward the center of the blade.

3. The convertible mower of claim 2, wherein the blade sails are triangular in shape.

4. The convertible mower of claim 1, wherein the housing has a generally vertically extending sidewall, and wherein the kicker surface is substantially planar.

5. The convertible mower of claim 4, wherein the substantially planar kicker surface is angularly disposed with respect to the vertically extending sidewall of the housing.

6. The convertible mower of claim 5, wherein the substantially planar kicker surface extends generally inwardly with respect to the rotational axis of the cutting blade and forwardly with respect to the direction of rotation of the cutting blade.

7. The convertible mower of claim 1, wherein the kicker surface is generally planar and is canted in such a way that it faces downwardly and inwardly so as to deflect the grass clippings downwardly and inwardly into the cutting path.

8. The convertible lawn mower of claim 1, wherein the discharge opening comprises a chute and the discharge opening blocking means comprises a plug which fits within the chute.

9. The convertible mower of claim 8, wherein the kicker member and the plug are injection molded plastic.

10. The convertible mower of claim 9, wherein the kicker member and the plug are polyethylene.

11. The convertible mower of claim 8, wherein the discharge chute is generally rectangular and the plug is also generally rectangular.

12. The convertible mower of claim 8, wherein the discharge chute has a generally rectangular cross section, and the discharge chute plug has a slightly smaller generally rectangular cross section formed by a generally rectangular plug top wall, a substantially triangular and planar plug sidewall, and a plug bottom wall, the plug bottom wall carrying the plug kicker.

13. The convertible mower of claim 12, wherein the plug further comprises a rear wall connected to the generally rectangular structure formed by the plug top wall, sidewall and bottom wall, wherein the rear wall carries a handle, whereby the plug can be easily inserted into and withdrawn from the discharge chute.

14. The convertible mower of claim 13, wherein a spring clip is mounted to the plug bottom wall such that when the plug is inserted into the discharge chute the spring clip engages the discharge chute to hold the plug in position.

15. The convertible mower of claim 1, wherein the kicker surface is supported by a generally triangular back surface, and the kicker and back surfaces join to form an inclined edge.

16. The convertible mower of claim 15, wherein the kicker and back surfaces form an angle of about 90°.

17. The convertible mower of claim 16, wherein the inclined edge of the kicker member is not radially oriented with respect to the vertical axis about which rotates the cutting blade.

18. The convertible mower of claim 1, wherein the kicker surface extends generally inwardly with respect to the rotational axis of the cutting blade and forwardly with respect to the direction of rotation of the cutting blade.

19. A wash-out system for a rotary lawn mower of the type having a housing defining a cutting chamber and a discharge opening for allowing grass clippings to flow out of the housing, the wash-out system comprising:
 (a) removable plug means for selectively blocking the discharge opening;
 (b) coupling means connected to and situated on the outside of the plug means for accepting a water hose;
 (c) nozzle means connected to and situated on the inside of the plug means; and
 (d) means for operatively connecting the coupling means to the nozzle means to provide fluid communication therebetween, whereby water from the hose flows through the coupling means, connecting means and nozzle means and injects into the cutting chamber to remove accumulated grass clippings therefrom.

20. The wash-out system of claim 19, wherein the housing has top and side walls and the nozzle means comprises a nozzle having a nozzle opening which directs the water substantially parallel to the housing walls.

21. The wash-out system of claim 19, wherein the housing has top and side walls and wherein the nozzle means comprises a nozzle having a pair of nozzle openings which produce a pair of oppositely directed streams which are substantially parallel to the housing walls.

22. The wash-out system of claim 21, wherein the nozzle openings are about 7/32 inch in diameter.

23. The wash-out system of claim 19, wherein the removable plug further comprises a kicker member connected to and situated on the inside of the plug means, the kicker member having a kicker surface lying generally in a plane oblique with respect to the generally horizontal cutting path of the mower blade, and disposed in the path of grass clippings to deflect the clippings generally downwardly into the cutting path when the plug means is blocking the discharge opening, whereby the clippings are deposited beneath the surface of the grass.

24. The wash-out system of claim 23, wherein the housing has top and side walls and the nozzle means comprises a nozzle having a nozzle opening which directs the water substantially parallel to the housing walls.

25. The wash-out system of claim 24, wherein the housing has top and side walls and wherein the nozzle means comprises a nozzle having a pair of nozzle openings which produce a pair of oppositely directed streams which are substantially parallel to the housing walls, and wherein one of the nozzle openings is directed toward the kicker member and the other nozzle opening is directed away from the kicker member.

26. A wash-out system for a rotary lawn mower having a housing defining a cutting chamber and a discharge opening for allowing grass clippings to leave the cutting chamber, the wash-out system comprising:

(a) removable means for selectively blocking the discharge opening; and (b) water passageway means carried on the removable means for allowing water to pass through the removable means and clean the cutting chamber when the removable means is in place blocking the discharge opening and when water is supplied to the water passageway from a water source.

27. The wash-out system of claim 26, wherein the discharge opening comprises an elongated discharge chute, and wherein the removable means comprises an elongated plug that is inserted into the chute.

28. The wash-out system of claim 27, wherein the plug has front and rear walls, and wherein the water passageway means extends between the front and rear plug walls.

29. The wash-out system of claim 28, wherein the water passageway means comprises:

(a) coupling means carried on the rear plug wall suited for connection to a water source;

(b) nozzle means carried on the front plug wall for spraying water into the cutting chamber; and (c) a connecting tube providing fluid communication between the coupling means on the rear plug wall and the nozzle means on the front plug wall to allow water to flow through the plug.

* * * * *